(12) United States Patent
Marshall et al.

(10) Patent No.: US 7,220,692 B2
(45) Date of Patent: May 22, 2007

(54) CATALYST FOR SELECTIVE $NO_x$ REDUCTION USING HYDROCARBONS

(75) Inventors: Christopher L. Marshall, Naperville, IL (US); Michael K. Neylon, Naperville, IL (US)

(73) Assignee: UChicago Argonne, LLC, Chicago, IL (US)

( * ) Notice: Subject to any disclaimer, the term of this patent is extended or adjusted under 35 U.S.C. 154(b) by 0 days.

(21) Appl. No.: 10/384,344

(22) Filed: Mar. 7, 2003

(65) Prior Publication Data

US 2005/0101473 A1  May 12, 2005

Related U.S. Application Data

(63) Continuation-in-part of application No. 09/975,708, filed on Oct. 11, 2001, now abandoned.

(51) Int. Cl.
| | |
|---|---|
| *B01J 29/06* | (2006.01) |
| *B01J 29/068* | (2006.01) |
| *B01J 29/14* | (2006.01) |
| *B01J 29/40* | (2006.01) |
| *B01J 29/46* | (2006.01) |

(52) U.S. Cl. .......................... 502/60; 502/65; 502/66; 502/73; 502/74; 502/77; 502/78; 502/79

(58) Field of Classification Search .............. 502/64, 502/65, 66, 73, 74, 77, 78, 79
See application file for complete search history.

(56) References Cited

U.S. PATENT DOCUMENTS

| | | | | |
|---|---|---|---|---|
| 4,962,075 A | * | 10/1990 | Green et al. | .................... 502/71 |
| 4,973,399 A | * | 11/1990 | Green et al. | ............. 208/120.1 |
| 5,006,496 A | * | 4/1991 | Huizinga et al. | ............. 502/61 |
| 5,077,253 A | * | 12/1991 | Chu et al. | ...................... 502/61 |
| 5,116,586 A | * | 5/1992 | Baacke et al. | ............ 423/239.2 |
| 5,270,024 A | * | 12/1993 | Kasahara et al. | ........ 423/213.2 |
| 5,276,249 A | * | 1/1994 | Greene et al. | .............. 588/206 |
| 5,409,671 A | * | 4/1995 | Takemoto et al. | ........... 422/180 |
| 5,676,912 A | * | 10/1997 | Sharma et al. | ............ 423/213.2 |
| 5,733,837 A | * | 3/1998 | Nakatsuji et al. | ............ 502/304 |
| 5,851,378 A | * | 12/1998 | Vogt et al. | ................... 208/108 |
| 5,935,889 A | * | 8/1999 | Murrell et al. | .................. 502/9 |
| 6,143,681 A | * | 11/2000 | Sachtler et al. | ................ 502/74 |
| 6,221,324 B1 | * | 4/2001 | Coq et al. | ................. 423/239.2 |

* cited by examiner

*Primary Examiner*—Elizabeth D. Wood
(74) *Attorney, Agent, or Firm*—Olson & Hierl Ltd.

(57) ABSTRACT

A two phase catalyst is disclosed with one or more transition metals such as Cu, Co, Fe, Ag and Mo supported on a molecular sieve having a pore size not greater than 8 Å along with a stabilizing oxide of one or more of the oxides of Zr, Mo, V, Nb or the rare earths coating the molecular sieve. A method of preparing the two phase catalyst and using same to remediate $NO_x$ in combustion gases is also described.

22 Claims, 9 Drawing Sheets

CATALYST FOR SELECTIVE NO$_X$ REDUCTION USING HYDROCARBONS

RELATED APPLICATIONS

This application is a continuation-in-part of U.S. patent application Ser. No. 09/975,708 filed Oct. 11, 2001 now abandoned.

CONTRACTUAL ORIGIN OF THE INVENTION

The United States Government has rights in this invention pursuant to Contract No. W-31-109-ENG-38 between the U.S. Department of Energy (DOE) and The University of Chicago representing Argonne National Laboratory.

FIELD OF THE INVENTION

The present invention relates to the reduction of nitrogen oxides (NO$_x$) present in a lean burn exhaust by the selective catalyst reduction of NO$_x$ by a hydrocarbon with a bifunctional catalyst.

BACKGROUND OF THE INVENTION

The combustion of fossil fuels unavoidably leads to the formation of nitrogen oxides (NO$_x$) which, if released to the atmosphere, can lead to acid rain and detrimental interactions with ozone. Increasing government regulations around the world have called for continued NO$_x$ emission reductions from both stationary and mobile sources, requiring new and improved technologies that can remove NO$_x$ from exhaust streams. While three-way catalysts have been optimized to reduce NO$_x$ emissions in rich-burn exhaust as from consumer automobiles, these catalysts are ineffective under lean-burn conditions, as usually observed with stationary sources or diesel engines. Reduction of NO$_x$ with ammonia has been used industrially for stationary sources. However, it is less desirable (especially in transportation systems) due to the toxic nature of the ammonia which must be stored locally. Alternative catalytic processes have been investigated for operation under lean burn conditions, with the selective catalytic reduction (SCR) of NO$_x$ with hydrocarbons being one of the most promising. These hydrocarbons are more readily available and pose less of a emission problem.

A large number of materials have been found to be catalyticly active for SCR. By far, the most widely reported in the open literature are metal-exchanged zeolites, such as Cu-ZSM-5, Co-ZSM-5, and Fe-ZSM-5. These have been found to be very active for SCR using C$_3$ hydrocarbons, with Cu-ZSM-5 being the most active. However, the zeolite-based materials lose much of their activity when water (common in exhaust streams) is added to the exhaust stream. The exact effects of water are not well known; it is speculated that either dealumination of the zeolite framework occurs which reduces the number of active sites, or that the metal sites agglomerate or are over-oxidized and lose their activity. While other catalysts that possess greater water stability have been found, such as metal-supported oxides, these tend to lack the desired activity seen by the metal zeolites, and produce large amounts of N$_2$O (also a major pollutant).

Patents which have varying relationships to the inventions at issue are, for instance, U.S. Pat. No. 5,116,586 issued to Baacke et al., May 26, 1992. This patent relates to a zeolite catalyst and a method for reduction of nitrogen oxides by mixing the waste gas with ammonia. As previously discussed in the background of this invention, the use of ammonia in the reduction of nitrogen oxide requires entirely different conditions than the present invention which is an NOx reduction catalyst utilizing hydrocarbons. The Baacke et al. patent does not show or suggest a two phase catalyst or the method of making the inventive two phase catalyst, nor obviously, the present catalysts themselves in which the stabilizing oxide coats the molecular sieve or zeolite material. Moreover, the use of ammonia itself presents a hazard.

The Green et al. U.S. Pat. No. 4,962,075 issued Oct. 9, 1990 discloses a single phase catalyst obtained by intimately mixing the powders of the oxide binder and the metal salts so that although a physical mixture is formed, the inventive two phase catalyst is not made. This patent teaches mixing particles of a metal exchanged zeolite with an oxide. In this case, both particles are usually quite large (500 nm to 50,000 nm) and although the particles physically contact each other, no two phase catalyst with intimate contact between the phases such as produced by the methods of Examples 1-3 hereafter.

The Green et al. U.S. Pat. No. 5,276,249 issued Jan. 4, 1994 relates to a catalyst composition for the destruction of halogenated organics. The Green et al. '249 patent like the Green et al. '075 patent does not show or suggest the inventive method of making the two phase catalyst of the present invention, and therefore, does not show or suggest the present inventive catalyst. Although the '075 patent does disclose the use of cerium oxide, the Green et al. '249 patent does not, neither patent teaches the present invention which uses metal oxide sols for creating the second phase.

Also cited in the parent case is the Sachtler et al. U.S. Pat. No. 6,143,681 issued Nov. 7, 2000. The Sachtler et al. patent uses an entirely different means of introducing the metal into the zeolite, such as by metal vapor deposition, which leaves the metal in a different state and the addition of cerium into the matrix is by ion exchange not by a sol as taught in the present invention. Moreover, the '681 patent does not show or suggest the addition of a rare earth oxide by the use of a sol as opposed to a salt. Therefore, the '681 patent as the other patents cited in the prior case do not show the method of the present invention and therefore do not show the two phase catalyst of the present invention.

SUMMARY OF THE INVENTION

The present invention is the development of bifunctional catalysts that combine active metal-exchanged molecular sieves along with a separate metal oxide stabilizing phase from a sol precursor forming an oxide coating thereon that offers hydrothermal stability with sustained activity at low temperature for lean burn or rich burn exhaust with or without water present under SCR conditions.

Accordingly, it is a principal object of this invention to provide an effective method and catalyst for the reaction of NO$_x$ in lean burn or rich burn exhaust with or without water present.

Yet another object of the invention is to provide a two phase catalyst comprising one or more transition metals supported on a molecular sieve and one or more stabilizing oxides coating the molecular sieve material.

A further object of the present invention is to provide a two phase catalyst comprising contacting a molecular sieve material having a pore size less than about 8 Å with a sol of oxide particles having average diameters of greater than 8 Å and less than about 100 nanometers to coat the molecular sieve particles with the oxide particles and loading the molecular sieve before and/or after the oxide coating with one or more transition metals.

Another object of the invention is to provide a two phase catalyst comprising a zeolite supported transition metal and a stabilizing oxide coated on the zeolite.

Still another object of this invention is to provide a method of remediating the concentration of nitrogen oxides ($NO_x$) in the exhaust from lean burn or rich burn combustion in the presence of water in which the exhaust containing water and $NO_x$ is contacted with one or more of an organic reductant or mixtures thereof at a temperature of not greater than about 600° C. with a two-part catalyst including a molecular sieve supported transition metal and a stabilizing metal oxide.

A final object of the present invention is to provide a method of remediating the concentration of nitrogen oxides ($NO_x$) in a combustion exhaust stream by contacting the exhaust stream with one or more organic reductants in the presence of water at a temperature not greater than 600° C. over a two phase catalyst comprising one or more transition metals of Cu, Co, Fe, Ag and Mo supported on a molecular sieve having a pore size not less than 8 Å, preferably between 4 Å and 8 Å and a stabilizing oxide of one or more of the oxides of Zr, Mo, V, Nb or the rare earths.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

DESCRIPTION OF THE PREFERRED EMBODIMENT

Figure 1:
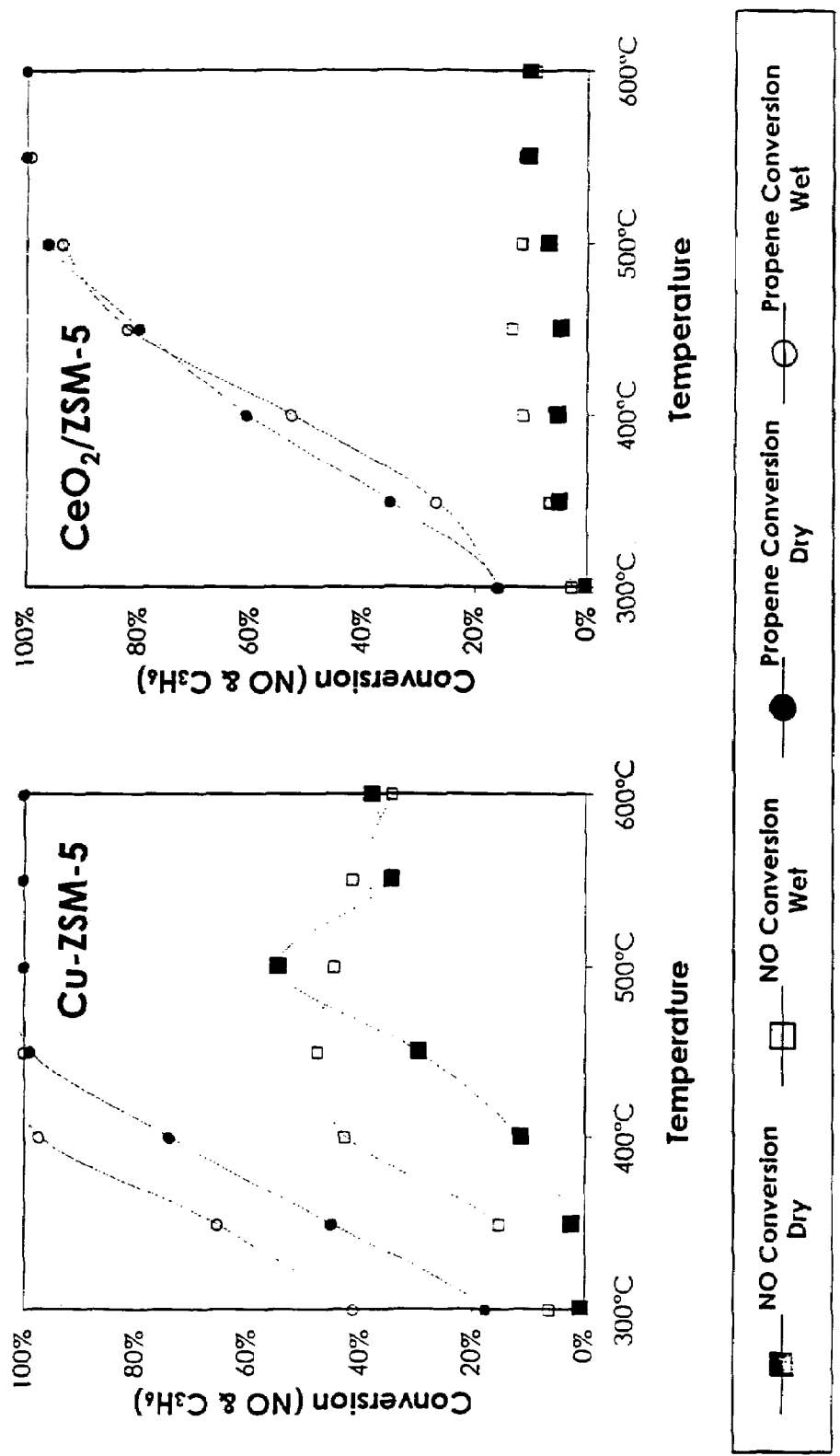
FIG. 1 is a graphical representation of the conversion of $NO_x$ and propene as a function of temperature for a Cu-ZSM-5 catalyst and a $CeO_2$/Cu-ZSM-5 catalyst. Closed symbols represent conversions under dry conditions, while open symbols represent conversions under wet (10% water) conditions.

While the preferred embodiment is generally illustrated by reference to examples involving a catalyst composed of a zeolite supported copper metal impregnated with a ceria stabilizing oxide, it should be understood that a variety of molecular sieve materials are satisfactory including zeolites. Specifically, zeolite Y, zeolite beta, mordenite, ferrierite, ZSM-5, and ZSM-12 are preferred. The molecular sieve preferably should have a pore size of at least about 4 Å. Moreover, any transition metal would be adequate to be supported by a molecular sieve in a wide variety of concentrations. However, commonly used transition metals are copper, cobalt, iron, silver, molybdenum, vanadium and various combinations thereof. Also, the supporting oxides can be any one or more of the rare earth oxides such as cerium oxide and transition metal oxides, such as zirconium oxide, molybdenum oxide, vanadium oxide and niobium oxide. Cerium oxide alone or in combination with one or more of the other rare earth oxides is preferred. All of the preferred oxides are added in the form of metal oxide sols.

Specifically, a wide variety of pore size zeolites has been investigated and it is preferred that the pore size be in the range of from about 4 Å and up to about 8 Å. In the art, these are referred to as medium pore and wide pore zeolites. Investigations have been conducted using various water concentrations up to about 20% by volume. It is believed that the stabilizing oxide may be present in the catalyst in the range of from about 0.1% by weight to in excess of about 40% by weight including the molecular sieve, with about 5% by weight being the minimum preferred and about 20% by weight being most preferred. It is also believed that the typical exchange levels for the transition metal may be anywhere from about 25-200% with 100% being preferred. Moreover, a variety of ratios of silicon to aluminum have been tested in zeolites and found to be satisfactory. Silicon to aluminum ratios found to be satisfactory are generally between about 238 and about 17 to one. While the reductions herein use organics such as propylene ($C_3H_6$) or hexane, any alkane or alkene between $C_1$ and $C_{16}$ is acceptable but $C_1$ to $C_8$ are preferred. In addition, non-organic reductants such as ammonia or urea are applicable as are organics such as alcohols.

Most of the examples investigated have been using the Cu-ZSM-5 and $CeO_2$ system. Besides physically mixing these catalysts, the bifunctional catalysts were synthesized in two distinct ways to vary the way the phases were mixed. The methods used here can be easily extended to incorporate a number of oxides, such as the rare earth oxides, zirconium oxide, vanadium oxide, the molybdenum oxides, the niobium oxides or combinations thereof, onto any transition metal-exchanged zeolite, including but not limited to Co-ZSM-5, Fe-ZSM-5, or Cu-ZSM-5, Ag-ZSM-5, Mo-ZSM-5 as well as the multimetallic-exchanged zeolites. Furthermore, it is believed that other zeolites besides ZSM-5, such as zeolite Y, Beta zeolite, the others synthetic or natural zeolites, or other molecular-sieve-like materials, such as silica-aluminophosphate (SAPO) or MCM-41, could be used as the primary component of the metal support.

EXAMPLE 1

Preparation of CeO$_2$/Cu-ZSM-5: Copper was ion exchanged with a ZSM-5 zeolite via typical means. A 0.01 M solution of Cu(NO$_3$)$_2$ was prepared, and 2 g of H-ZSM-5 (SiO$_2$/Al$_2$O$_3$=80) was stirred into 40 ml of the solution. The slurry was stirred overnight at room temperature, then filtered, washed with distilled water, dried at 100° C. in a vacuum oven, then calcined in air at 500° C. for 3 hrs. Copper loadings can be adjusted by changing the concentration of the solution, the pH of mixing, or by repeated exchanges with the solution. Ceria was introduced by first diluting a ceria sol from 20 wt % to 0.01M. Two grams of the Cu-ZSM-5 was mixed with 40 ml of the ceria solution, and was stirred overnight at room temperature. The slurry was filtered, washed, dried, and then calcined using the same conditions above. This catalyst will be referred to as "CeO$_2$/Cu-ZSM-5".

EXAMPLE 2

Preparation of Cu-ZSM-5/CeO$_2$: High surface area ceria was first prepared following traditional procedures. Five grams of cerium carbonate was slowly mixed with 4.5 ml of glacial acetic acid to produce cerium acetate. The sample was dried in a vacuum over at 100° C., the calcined in air at 425° C. to produce cerium oxide. The ceria was coated with a layer of Al$_2$O$_3$ to act as a template by mixing 2 g of the ceria with 40 ml of a 0.01M Al$_2$O$_3$ sol (diluted from a 20 wt % sol), stirring overnight, then filtering, washing, drying, and calcining in air at 500° C. as above. The zeolite precursor solution was prepared by mixing a solution containing NaOH, dissolved Al foil, and H$_2$O with tetraethylorthosilicate (TEOS) and tetrapropylammonium hydroxide (TPAOH) such that the molar concentrations in the final solution was 4:0.06:571:6:1 NaOH:Al:H$_2$O:TEOS:TPAOH. The solution was stirred at room temperature overnight, then approximately 40 ml was added to 2 g of the Al$_2$O$_3$ coated ceria in an autoclave. The autoclave was heated to 175° C. for 6 hrs under autogenic pressure. After rapid cooling, the sample was filtered, washed, dried, then calcined for 6 hrs in air at 500° C. to remove residual organic compounds. Copper was exchanged with the zeolite film/ceria following the methods listed above for CeO$_2$/Cu-ZSM-5. The final catalyst will be referred to as "Cu-ZSM-5/CeO$_2$".

EXAMPLE 3

In addition to the catalysts above, additional catalysts tested included: a Cu-ZSM-5 prepared similarly to CeO$_2$/Cu-ZSM-5 but without ceria addition, and a quantity of the Cu-ZSM-5 catalyst mixed in a equal weight ratio with the high surface area ceria prepared above. This latter catalyst was mixed by gentle grinding in a mortar for about 10 minutes.

EXAMPLE 4

Preparation of Cu-ZSM-5 and CeO$_2$/Cu-ZSM-5 of various SiO$_2$/Al$_2$O$_3$ ratios: These materials were prepared similarly to the Cu-ZSM-5 and CeO$_2$/Cu-ZSM-5 materials of Example 1, but using H-ZSM-5 precursor materials with SiO$_2$/Al$_2$O$_3$ molar ratios of 280, 55, and 30.

EXAMPLE 5

Preparation of ZrO$_2$/Cu-ZSM-5: This material was prepared similarly to the CeO$_2$/Cu-ZSM-5 material of Example 1, but using a nanoparticle ZrO$_2$ sol in place of the CeO$_2$ sol.

EXAMPLE 6

Preparation of MoO$_3$/Cu-ZSM-5: This material was prepared similarly to the CeO$_2$/Cu-ZSM-5 material of Example 1, but standard incipient wetness of ammonium heptamolybdate salt was used instead of the slurry method.

EXAMPLE 7

Preparation of (CeO$_2$,ZrO$_2$)/Cu-ZSM-5: This material was prepared similarly to the CeO$_2$/Cu-ZSM-5 material of Example 1, but using a 50:50 (by weight) mixture of the CeO$_2$ and ZrO$_2$ sols.

EXAMPLE 8

Preparation of Co-ZSM-5: This material was prepared similarly to the Cu-ZSM-5 sample of Example 1, but using Co(NO$_3$)$_2$ salt as the cobalt precursor. Additionally, the slurry was gently warmed during the exchange process to ca. 50° C.

EXAMPLE 9

Preparation of CeO$_2$/Co-ZSM-5: This material was prepared similarly to the CeO$_2$/Cu-ZSM-5 sample of Example 8, but starting with the Co-ZMS-5 sample from Example 7.

EXAMPLE 10

Preparation of CeO$_2$/(Cu,Co)-ZSM-5: This material prepared similarly to the CeO$_2$/Cu-ZSM-5 material of Example 1, but instead of only Cu(NO$_3$)$_2$ solution for the exchange process, a solution containing 0.005M Cu(NO$_3$)$_2$ and 0.005M Co(NO$_3$)$_2$ was used for co-exchange.

EXAMPLE 11

Preparation of Cu-MOR and CeO$_2$/Cu-MOR: These materials were prepared similarly to the Cu-ZSM-5 and CeO$_2$/Cu-ZSM-5 materials from Example 1, but instead of H-ZSM-5 as the precursor material, H-MOR (SiO$_2$/Al$_2$O$_3$ molar ratio of 20) was used as the precursor.

EXAMPLE 12

Preparation of Cu-ZSM-5. Cu-ZSM-5 material was prepared from the ammonium form of ZSM-5 via the exchange of Cu(NO$_3$)$_2$. A 0.01M solution of Cu(NO$_3$)$_2$ was prepared from. Approximately 20 g of NH$_4$-ZSM-5 (SiO$_2$/Al$_2$O$_3$=50) was massed into a beaker, and the Cu(NO$_3$)$_2$ solution was added at a ratio of 10 ml/g (ca. 200 ml). The slurry was then stirred vigorously while monitoring its pH, typically in the range of pH 2-4. A 0.1M solution of NH$_4$OH was slowly added drop-wise to the slurry until the pH remained stable near 8.0. The solution was left to stir overnight (>18 hrs). After stirring, the solution was filtered then rinsed with distilled water. The collected solids were then dried in an oven at ca. 110° C. to remove the bulk of the moisture, then transferred to a calcination oven at 500° C. for 3 hours. The sample was then removed and collected. The above process (starting with Cu(NO$_3$)$_2$ solution addition) was repeated twice more to increase the exchange level on the Cu-ZSM-5 to about 100%.

EXAMPLE 13

Preparation of CeO$_2$/Cu-ZSM-5 (Forward, ca. 20 wt % loading). The Cu-ZSM-5 material from Example 12 was used as a precursor to the preparation of the two-phase catalyst. A CeO$_2$ sol from Nyacol (20% wt) was used as the CeO$_2$ precursor. Approximately 2 g of Cu-ZSM-5 was put into a pyrex dish. CeO$_2$ sol was added drop-wise into the solid, with vigorous stirring after each drop, until the solid-liquid mixture became paste-like, and the solid material was completely wetted, typically obtained after about 2 ml of sol addition. The mixture was placed into an oven at ca. 110° C. to remove the bulk of the moisture, and then the remaining solid was collected and transferred to a calcination oven at 500° C. for 3 hours. The sample was then removed and collected. This method was called the "forward" method with respect to the order of the copper and ceria loading.

EXAMPLE 14

Preparation of CeO$_2$/Cu-ZSM-5 (Forward, ca. 40% loading). A sample was prepared following the methods of Example 13. This precursor material was then subjected to the same medication as outlined in Example 13 as to double the loading of the ceria.

EXAMPLE 15

Preparation of CeO$_2$/Cu-ZSM-5 (Forward, ca. 10% loading). This material was prepared similarly to Example 13, but prior to addition, the CeO$_2$ sol was diluted in half by the addition of an equal amount of water as to reduce the sol concentration to ca. 10 w %. This diluted sol was then added in the same fashion as outlined in Example 13.

EXAMPLE 16

Preparation of CeO$_2$/ZSM-5 (20% loading). This material was prepared similarly to Example 13, but using the NH$_4$-ZSM-5 form of the zeolite provided as the reagent as opposed to the Cu-ZSM-5 material.

EXAMPLE 17

Preparation of CeO$_2$/Cu-ZSM-5 (Reverse, 20% loading). This material was prepared similarly to Example 12, but using the CeO$_2$/H-ZSM-5 material of Example 16 as the initial precursor. Three Cu exchange steps were performed as per Example 12. This method was called the 'reverse' method with respect to the order of the copper and ceria loading.

EXAMPLE 18

Preparation of CeO$_2$/Cu-ZSM-5 (Reverse, 40% loading). Material was prepared as per Example 16. The resulting material was then impregnated again with CeO$_2$ sol following the sample procedure of Example 16 to increase the ceria loading. Copper was then exchanged onto this material as per Example 17.

EXAMPLE 19

Preparation of CeO$_2$/Cu-ZSM-5 (Reverse, 10% loading). Initial material was prepared similarly to Example 16, but using the diluted sol as per Example 15. Copper was then exchanged onto this material as per Example 17.

EXAMPLE 20

Preparation of Ce$_{0.8}$Sm$_{0.2}$O$_2$ sol. A 0.08M solution of Ce(NO$_3$)$_3$ and a 0.08M solution of Sm(NO$_3$)$_3$ were mixed in the appropriate ratio to achieve the desired metal oxide composition; for the ratio of Ce:Sm of 4 in the present example, 65 ml of the Ce(NO$_3$)$_3$ solution were combined with 16 mL of the Sm(NO$_3$)$_3$ solution. The metal hydroxides were coprecipitated as a gel by the drop-wise addition of concentrated ammonium hydroxide until a pH above 9 was maintained. The gel material was filtered and then washed twice with ca. 100 mL distilled water followed by one washing with ca. 50 mL ethanol. The collected solid was then placed into an oven at 110° C. under reduced pressure for 4 hours, which caused the gel to collapse into a glass-like form. The pulverized product was peptized in acetic acid and diluted in distilled water to the desired concentration (20 wt % in the present example).

EXAMPLE 21

Preparation of Ce$_{0.8}$Sm$_{0.2}$O$_2$—/Cu-ZSM-5 (Forward, 20% loading). This material was prepared similarly to Example 13, but using the sol from Example 20 as the sol precursor material.

EXAMPLE 22

Preparation of Ce$_{0.8}$Zr$_{0.2}$O$_2$ sol. This material was prepared similarly to Example 20, except a 0.08M solution of ZrO(NO$_3$)$_2$ was used instead the Sm(NO$_3$)$_3$ solution. Additionally, after the vacuum drying, the sample was peptized by dilute nitric acid in a digestion bomb overnight at 135° C.; the concentration of the nitric acid was determined based on a ratio of NO$_3$ to total metal content (Ce and Zr) of 0.25. The suspension obtained was air-dried first and then placed in an oven at 110° C. for 30 minutes. The powder was re-dispersed in distilled water and passed through a 0.2µ filter. The concentration of the sol was adjusted to 20 wt % oxide.

EXAMPLE 23

Preparation of Ce$_{0.8}$Zr$_{0.2}$O$_2$/Cu-ZSM-5 (Forward, 20% loading). This material was prepared similar to Example 13, but using the sol from Example 22 as the sol precursor material.

EXAMPLE 24

DeNO$_x$ Activity of Samples. The samples prepared in Examples 1-11 were tested for deNOx activity and the results are illustrated on FIGS. 1-7. The samples prepared in Examples (12-23) were tested for deNO$_x$ as described below hereafter and the conversion of NO to N$_2$ over the temperature range of 250-400° C. is listed in Table 1.

TABLE 1

| Material | Example | NO to $N_2$ Conversion (%) | | | |
|---|---|---|---|---|---|
| | | 250° C. | 300° C. | 350° C. | 400° C. |
| Cu—ZSM-5 | 12 | 6 | 18 | 47 | 60 |
| $CeO_2$/Cu—ZSM-5 (Forward, 20%) | 13 | 40 | 35 | 26 | 20 |
| $CeO_2$/Cu—ZSM-5 (Forward, 40%) | 14 | 45 | 34 | 22 | 14 |
| $CeO_2$/Cu—ZSM-5 (Forward, 10%) | 15 | 22 | 50 | 37 | 25 |
| $CeO_2$/Cu—ZSM-5 (Reverse, 20%) | 17 | 22 | 64 | 52 | 43 |
| $CeO_2$/Cu—ZSM-5 (Reverse, 40%) | 18 | 22 | 55 | 37 | 26 |
| $CeO_2$/Cu—ZSM-5 (Reverse, 10%) | 19 | 17 | 59 | 45 | 35 |
| $Ce_{0.8}Sm_{0.2}O_2$/Cu—ZSM-5 (Forward, 20%) | 21 | 13 | 46 | 38 | N/A |
| $Ce_{0.8}Zr_{0.2}O_2$/Cu—ZSM-5 (Forward, 20%) | 23 | 20 | 48 | 30 | 24 |

The $NO_x$ conversion activity was performed as follows. Approximately 150 mg of sample was loaded into a quartz tube, and connected to a gas manifold system. Prior to reaction, the sample was pretreated in He at 500° C. for one hour. Gases were available as 5.025% NO in He, 3.0% $C_3H_6$ in He, 4.96% $O_2$ in He, and pure He. The gases were controlled with Brooks 5850e mass flow controllers as to introduce a gas flow of 1000 ppm NO, 1000 ppm $C_3H_6$, 2% $O_2$, and the balance He at a space velocity of approximately 30,000 $hr^{-1}$. For water tests, water was pumped into the system with a syringe pump and the water and gas flows were adjusted to give the same concentration of gases above and 10% $H_2O$. The reaction was allowed to proceed at 500° C. for 3 hrs prior to taking any readings. The reaction temperature was varied between 200° C. and 600° C. in 50° C. increments, allowing for at least 30 minutes at temperature before analyzing the effluent. The reaction effluent was analyzed using an MTI micro gas chromatograph with molecular sieve 5 Å and poropak Q columns for the stationary and hydrocarbon gases, or with a California Analytical Instruments $NO_x$ detector, model HCLD-400, for the NO and $NO_2$.

The reduction of $NO_x$ and $C_3H_6$ over Cu-ZSM-5 and ceria on ZSM-5 are shown on FIG. 1. As can be seen, at about 350° C., the zeolite supported copper shows a $NO_x$ conversion under wet conditions of just under 20% whereas the ceria and zeolite shows an $NO_x$ conversion under wet conditions of just under 10%.

Figure 2:
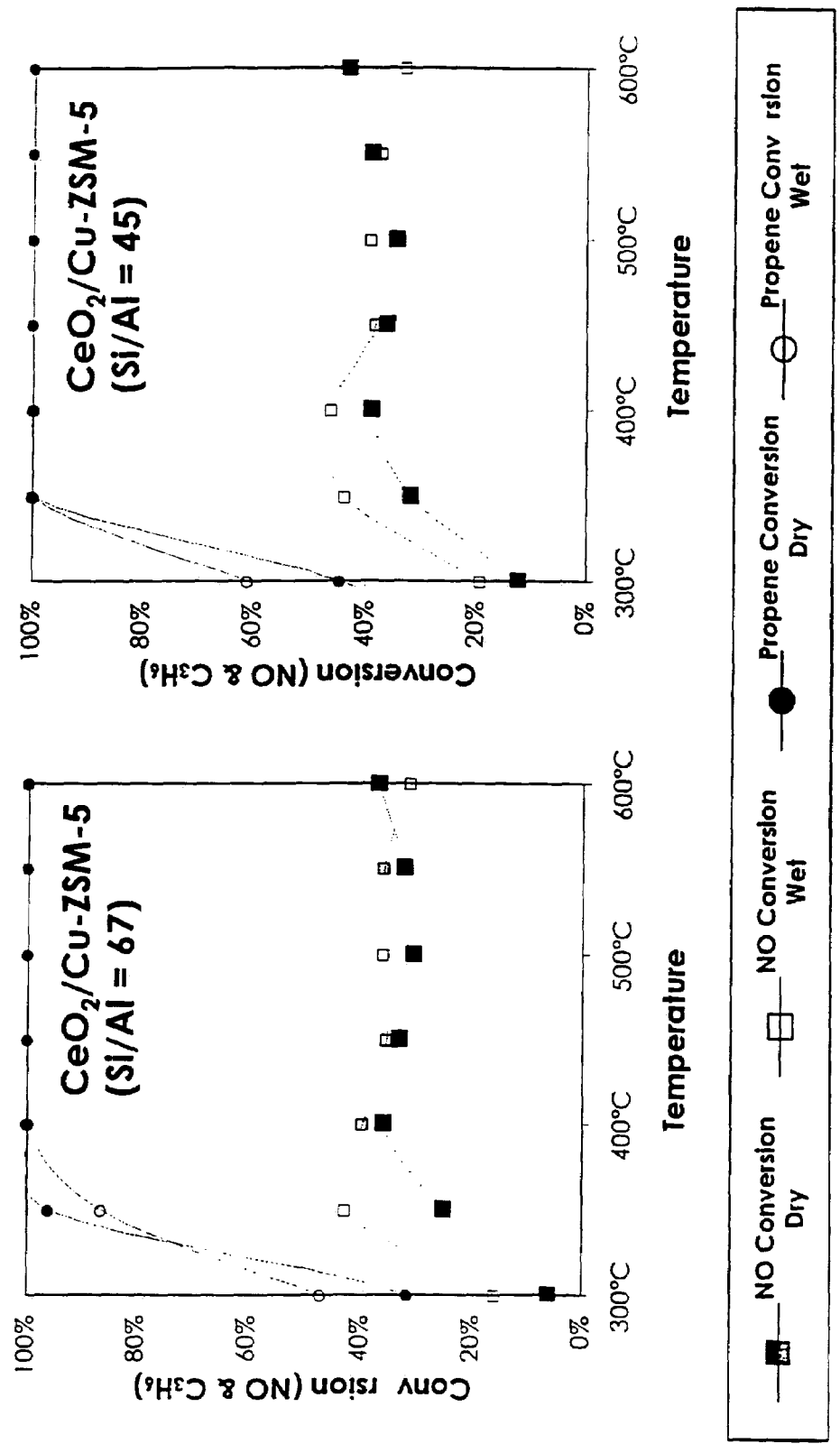
FIG. 2 is a graphical representation of the conversion of $NO_x$ and propene over a zeolite supported copper catalysts stabilized with ceria illustrating various silicon to aluminum ratios.

Referring to FIG. 2, it can be seen that the combination of a zeolite supported copper and ceria catalyst provides $NO_x$ conversions in the presence of water in excess of 40% at about 350° C. for both the silicon to aluminum ratios displayed in FIG. 2, that is a silicon to aluminum ratio of 67 and a silicon to aluminum ratio of 45. These conversions are outstanding. Only small amounts of $NO_2$ (<10 ppm) were observed, and no other nitrogen oxide species was present. Carbon dioxide was the only observable product from $C_3H_6$ oxidation. The Cu-ZSM-5/$CeO_2$ catalyst had slightly lower maximum $NO_x$ activity than the Cu-ZSM-5. In all cases, the maximum $NO_x$ conversion approaches the temperature when the propene is nearly all consumed.

Under wet conditions, the Cu-ZSM-5 catalyst shows significant loss in $NO_x$ and hydrocarbon conversion activity. The $CeO_2$/Cu-ZSM-5 catalyst shows improved $NO_x$ activity under wet conditions, possessing $NO_x$ conversion levels over 40%.

After reaction, the used catalysts were examined in the reactor prior to removal. It was noted that Cu-ZSM-5 catalyst showed significant discoloration throughout the bed, indicative of coking. However, with the other catalysts tested, it was observed that only a small fraction of the bed length was discolored, the rest of the bed remaining the same color as the original sample.

The ceria improves the Cu-ZSM-5 in two ways. First, it provides necessary water stability Ceria also aids the $NO_x$ conversion reaction, based on improved activities with the $CeO_2$/Cu-ZSM-5.

Figure 3:
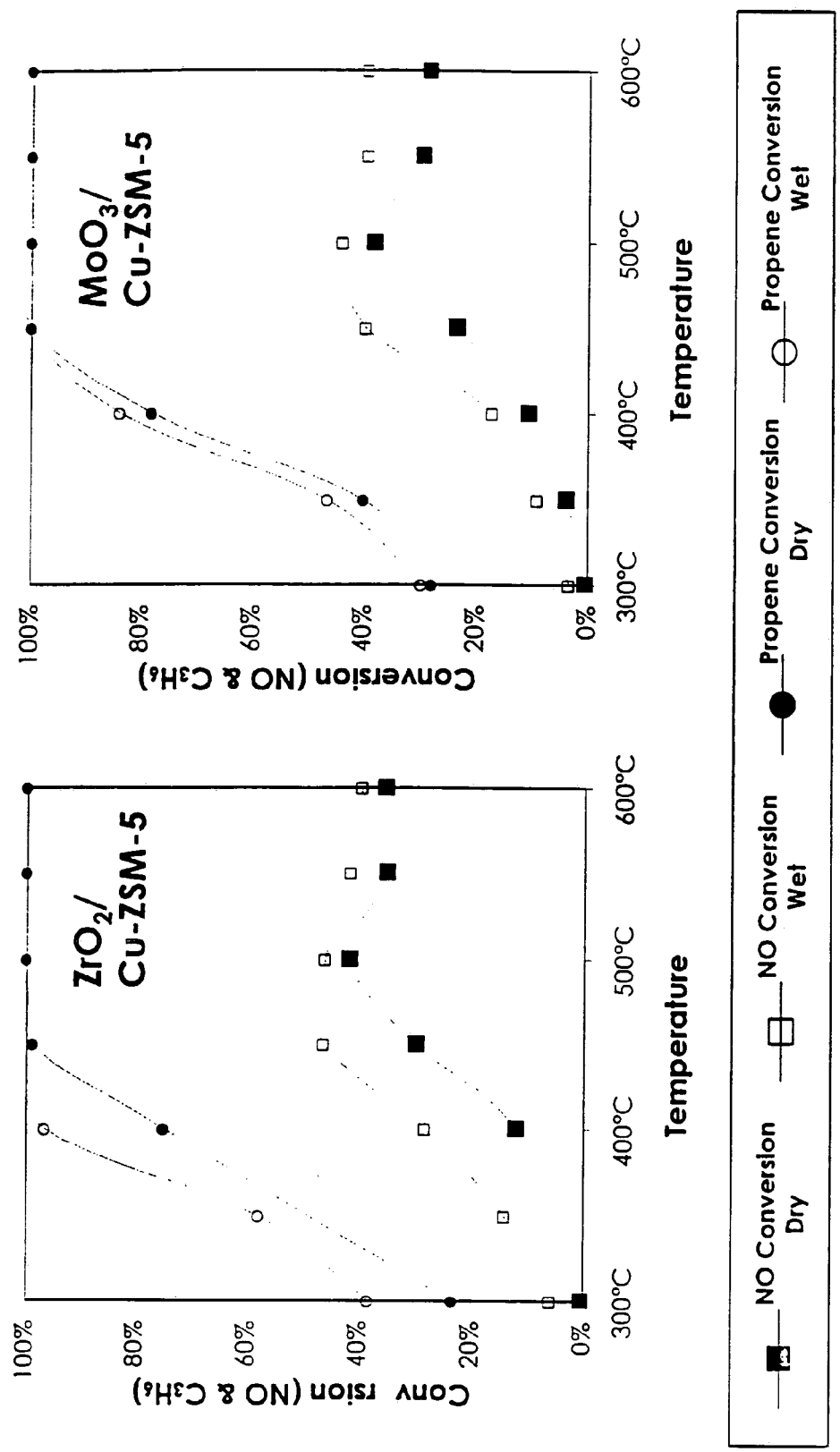
FIG. 3 is a graphical representation of the conversion of $NO_x$ and propene as a function of temperature for copper supported zeolite stabilized with $ZrO_2$ and a copper supported zeolite stabilized with molybdenum oxide.

FIG. 3 shows similar data for a catalyst comprised of a zeolite supported copper with zirconia and a zeolite supported copper with molybdenum oxide. In these data it is clear that the zirconia containing catalyst is a superior performer at lower temperatures such as 400° C., whereas at 450° C., the molybdenum containing catalyst is very good.

Figure 4:
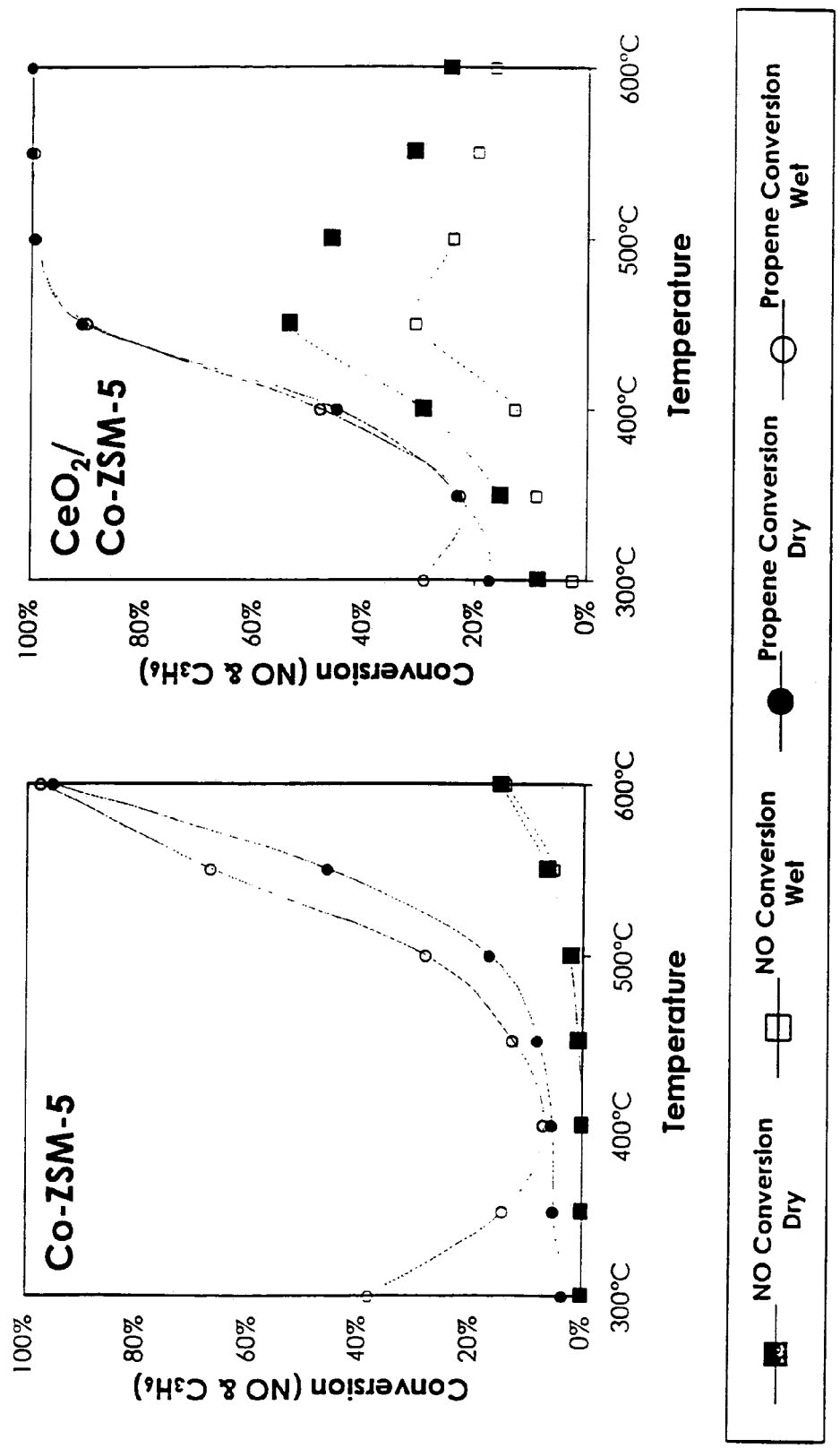
FIG. 4 is a graphical representation of the conversion of $NO_x$ and propene as a function of temperature for a cobalt supported zeolite and a cobalt supported zeolite stabilized with $CeO_2$.

FIG. 4 shows a comparison of a cobalt and a combination of a zeolite supported cobalt with ceria. As can be seen from the data, without the ceria present there is little, if any, $NO_x$ conversion under wet conditions whereas with the ceria present there is substantial conversion at 450° C.

Figure 5:
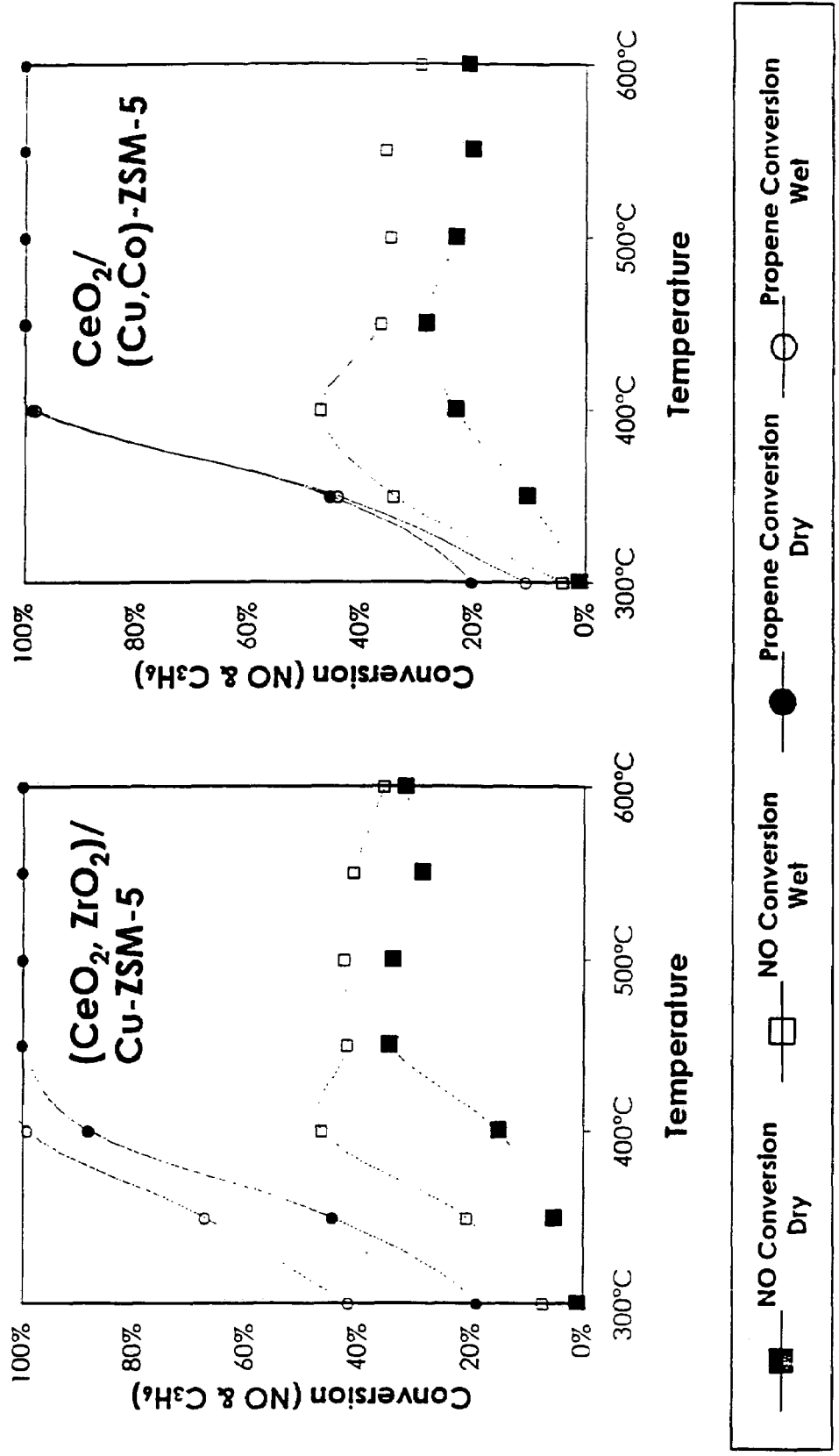
FIG. 5 is a graphical representation of the conversion of $NO_x$ and propene as a function of temperature for copper supported zeolite stabilized with $CeO_2$ and $ZrO_2$ and a copper and cobalt supported zeolite.

FIG. 5 shows data for a variety of catalyst, the first being a zeolite supported copper with a combination of ceria and zirconia which shows excellent $NO_x$ conversions under wet conditions at about 400° C. and acceptable but less conversions at 350° C. Similarly, the copper cobalt supported zirconia with ceria shows excellent $NO_x$ conversions under wet conditions both at 4000 and 350° C.

Figure 6:
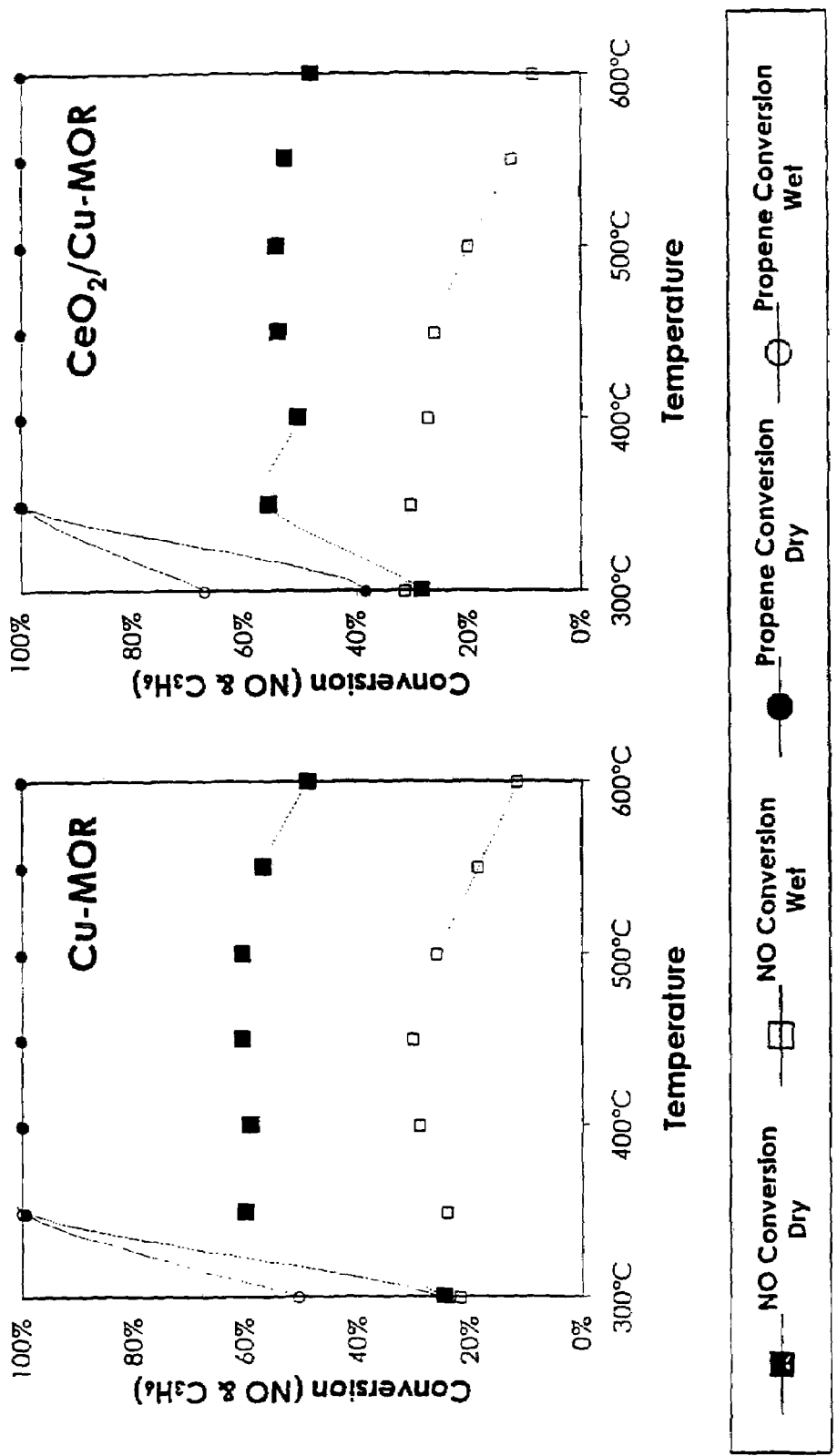
FIG. 6 is a graphical representation of the conversion of $NO_x$ and propene as a function of temperature for a copper supported mordenite and a copper supported mordenite stabilized with $CeO_2$.

FIG. 6 illustrates comparisons of a mordenite supported copper and a mordenite supported copper with ceria under both wet and dry conditions. It is seen that the inventive catalyst, that is the copper supported mordenite with ceria has clearly superior activity at temperatures under 400° compared to the copper supported mordenite.

Figure 7:
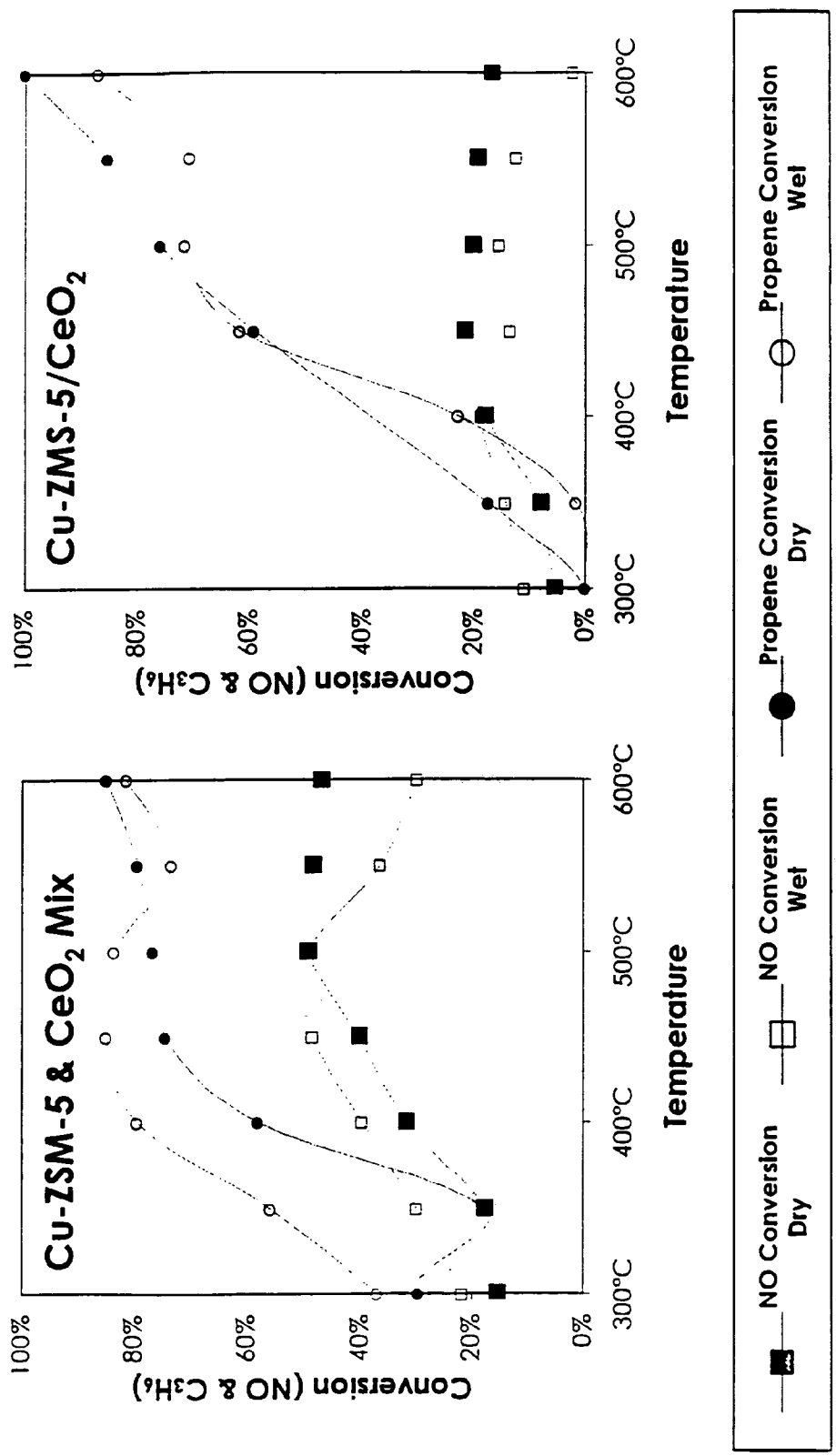
FIG. 7 is a graphical representation of the conversion of $NO_x$ and propene as a function of temperature for a physical mixture of Cu-ZSM-5 and $CeO_2$ and Cu-ZSM-5/$CeO_2$.

Finally in FIG. 7, shows data for a physical mixture of ceria and Cu-ZSM-5 and Cu-ZSM-5 on ceria. Note that these catalysts were tested at a space velocity of 10,000 $Hr^{-1}$ and 20% water when present. The physical mixture of Cu-ZSM-5 and $CeO_2$ showed no loss in activity, but only a slight shift in temperature where the maximum activity occurred. In the case of Cu-ZSM-5/$CeO_2$, there is still some loss of NO conversion, but not as great as the Cu-ZSM-5 alone, while hydrocarbon conversion remained high.

Figure 8:
FIG. 8 is a Scanning Electron Micrograph (SEM) Cu-ZSM-5 without the stabilizing oxide.
Figure 9:
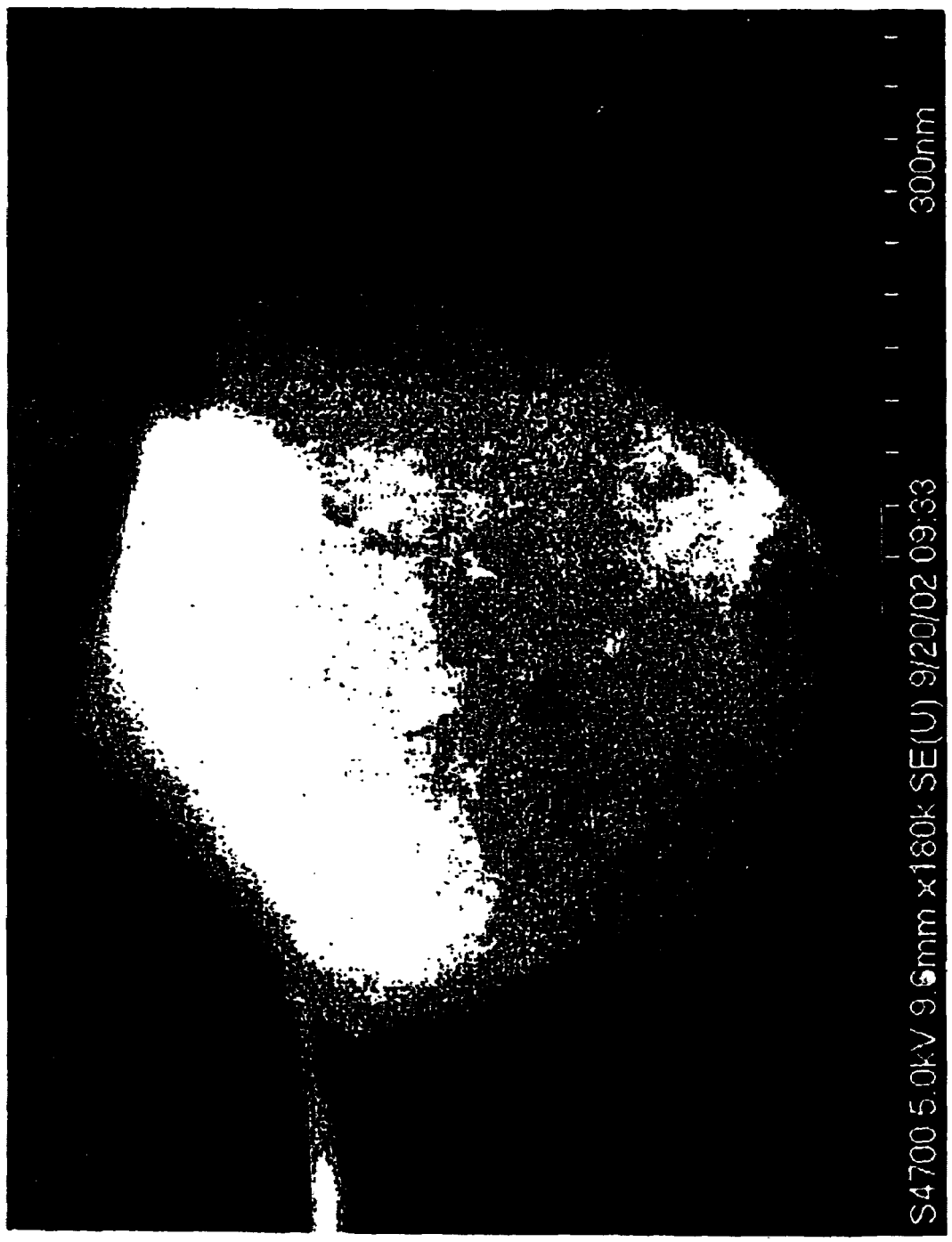
FIG. 9 is a SEM of Cu-ZSM-5 with a coating of the stabilizing oxide ($CeO_2$).

FIGS. 8 and 9 are Scanning Electron Microscopy (SEM) of a zeolite without the stabilizing oxide (see FIG. 8) and a zeolite with a coating of the stabilizing oxide (FIG. 9). As seen from the two SEMs, the stabilizing oxide entirely coats the zeolite applied by the method hereinbefore set forth adding the oxide in the form of colloidal sol.

The possible concentration ranges for the metal salt solution in the range of from 0.001M to about 1M solutions, but preferably in the range of 0.01M to 0.1M. The pH of the zeolite/solution slurry will typically start in the pH range from 2 to 5; the pH of the solution can be raised as high as 12 with ammonia hydroxide solution, but is typically only raised to a pH between 6 and 8. Certain metal salts, such as $Co(NO_3)_2$, will exchange better at higher temperatures; when used, the slurry is taken to temperatures between 50 and 80° C. in a refluxing unit during the exchange process. All of these variables can be used to influence the rate, quantity, and quality of the metal exchange process on the zeolite.

Nano-particle sols can be obtained through many industrial sources; however, it is sometimes necessary to prepare these sols directly as illustrated in Example 2 and others, particularly in the case of mixed metal oxides. By nanoparticles, we mean particles having an average diameter of less than about 100 nanometers and preferably in the range of from about 20 to about 40 nanometers. In any event, the oxides prepared from these sols should have diameters larger than the pore sizes of the molecular sieves, so that the stabilizing oxides do not enter the sieve but coat same. Generally, these sols are made by the peptization of a dry oxide gel in an acidic medium. The oxide gel can be prepared by a number of procedures, most commonly by (co) precipitation of the metal hydroxide from a solution of the metal salts by ammonium hydroxide. For mixed metal sols, the desired metal ratio in the final sol can be controlled by the appropriate mixing of the initial metal salts. Additional information on sol formation can be found in D. -H. Tsai and T. J. Huang, *Appl. Catal. A.*, 223, 1-9 (2002), and J. L. Woodhead, U.K. Patent 2102780.

The data reported herein were for lean-burn combustion gases, that is combustion gases in which air or oxygen was present in greater than stoichiometric quantities. Moreover, all the data reported herein had between about 10 and 20% by volume water present in the combustion gases. However, the inventive catalyst is operable in either rich or lean burn conditions with or without water. Currently, the best conditions for $NO_x$ remediation is with C:N rations of from 1:1 to 16:1. Gas mole to gas mole ratios of 1:1 to 10:1 are preferred. Space velocities from 1,000 hr.$^{-1}$ to about 100,000 hr.$^{-1}$ are estimated with space velocities of 30,000 hr.$^{-1}$ having been measured. Moreover, essentially all the remediated $NO_x$ is converted to $N_2$ with little if any $N_2O$ being produced.

Accordingly, two phase catalysts prepared according to the methods of Examples 1 to 11 herein are molecular sieves having pore sizes up to about 8 Å supporting one or more transition metals, with the molecular sieve particles coated by a stabilizing oxide. Examples 12 to 23 herein illustrate additional formations of the inventive two phase catalysts and method of making same. Not only are the catalysts distinctive for their two phase formation, but the oxide coating herein disclosed provides the unusual catalytic activity with layer oxide loadings than heretofore available. Oxide loadings of 40% by weight are reported in Table 1 and it is believed loadings of about 50% by weight can be obtained. Valuable catalytic materials with oxide loadings of up to 10% by weight but preferably, up to about 20% by weight have been used.

While there has been disclosed what is considered to be the preferred embodiment of the present invention, it is understood that various changes in the details may be made without departing from the spirit, or sacrificing any of the advantages of the present invention.

The invention claimed is:

1. A two phase hydrocarbon $NO_x$ reduction catalyst comprising one or more transition metals supported on a molecular sieve and one or more stabilizing oxides coating the molecular sieve, wherein said oxide coating is substantially all and only on the exterior surface of said molecular sieve.

2. The catalyst of claim 1, wherein the molecular sieve has a pore size not greater than about than 8 Å.

3. The catalyst of claim 1, wherein the molecular sieve is zeolite.

4. The catalyst of claim 3, wherein the zeolite has a pore size between 4 and 8 Å.

5. The catalyst of claim 3, wherein the zeolite is aluminosilicate.

6. The catalyst of claim 5, wherein the zeolite includes one or more of zeolite Y, zeolite beta, ZSM-5, ZSM-12, mordenite, or ferrerite.

7. The catalyst of claim 5, wherein the zeolite has a silicon-to-aluminum ratio between about 17 and about 238.

8. The catalyst of claim 1, wherein the transition metal includes one or more of Cu, Co, Fe, Ag, and Mo.

9. The catalyst of claim 8, wherein the transition metal is Cu.

10. The catalyst of claim 8, wherein the transition metals are present in the catalyst up to about 200% by weight.

11. The catalyst of claim 10, wherein the stabilizing oxides includes one or more of the oxides of Zr, Mo, V, Nb, or the rare earths.

12. The catalyst of claim 11, wherein the stabilizing oxide is $CeO_2$.

13. The catalyst of claim 12, wherein the stabilizing oxides are present in the catalyst not less than about 20% by weight.

14. The catalyst of claim 1, wherein the transition metal supported molecular sieve and the stabilizing oxide are physically mixed when the stabilizing oxide is in the form of a sol.

15. The catalyst of claim 14, wherein the stabilizing oxide coats the outside of the molecular sieve.

16. The catalyst of claim 1, wherein the molecular sieve is contacted by a stabilizing oxide sol with particles between about 20 to about 40 nanometers in diameter.

17. A two phase hydrocarbon $NO_x$ reduction catalyst comprising one or more transition metals of Cu, Co, Fe, Ag and Mo supported on a molecular sieve having a pore size not greater than about 8 Å and a stabilizing oxide of one or more of the oxides of Zr, Mo, V, Nb, or earths coating the molecular sieve, wherein said coating is substantially all and only on the exterior surface of said molecular sieve.

18. The catalyst of claim 17, wherein the transition metal is Cu.

19. The catalyst of claim 17, wherein the stabilizing oxide is $CeO_2$.

20. The catalyst of claim 17, wherein the transition metal is Cu and the stabilizing oxide is $CeO_2$ and the molecular sieve is ZSM-5.

21. The catalyst of claim 20, wherein the Cu is present up to about 10% by weight of the catalyst and the $CeO_2$ is present up to about 40% by weight of the catalyst.

22. A two phases hydrocarbon reduction catalyst comprising copper and a stabilizing oxide of cerium oxide coating a molecular sieve of ZSM-5, wherein said cerium oxide coating is substantially all and only on the exterior surface of the molecular sieve.

* * * * *

UNITED STATES PATENT AND TRADEMARK OFFICE
CERTIFICATE OF CORRECTION

| | | |
|---|---|---|
| PATENT NO. | : 7,220,692 B2 | Page 1 of 1 |
| APPLICATION NO. | : 10/384344 | |
| DATED | : May 22, 2007 | |
| INVENTOR(S) | : Christopher L. Marshall and Michael K. Neylon | |

It is certified that error appears in the above-identified patent and that said Letters Patent is hereby corrected as shown below:

Claim 17, line 41, after the word "or" insert --the rare--.

Claim 22, line 54, delete the word "phases" and insert --phase--.

Signed and Sealed this

Sixteenth Day of October, 2007

JON W. DUDAS
*Director of the United States Patent and Trademark Office*